(No Model.)

F. W. KRAUSE.
HORSE COLLAR PAD.

No. 378,055. Patented Feb. 14, 1888.

Witnesses:
H. W. Baldwin
M. J. Brewer

Inventor:
Fred Wm. Krause

UNITED STATES PATENT OFFICE.

FREDERICK WILLIAM KRAUSE, OF SAND CREEK, WISCONSIN.

HORSE-COLLAR PAD.

SPECIFICATION forming part of Letters Patent No. 378,055, dated February 14, 1888.

Application filed April 20, 1887. Serial No. 235,549. (No model.)

*To all whom it may concern:*

Be it known that I, FREDERICK WILLIAM KRAUSE, a citizen of the United States, residing at Sand Creek, in the county of Dunn and State of Wisconsin, have invented a new and useful Double Collar-Pad, of which the following is a specification.

My invention relates to certain new and useful improvements in collar-pads; and it consists in the novel construction and arrangement of the parts thereof, which will be more fully hereinafter described, and particularly pointed out in the claim.

The object of my invention is to provide a collar-pad adapted to be used on animals having sore necks; and to this end I construct two side pads centrally connected by a thin webbing of suitable material which passes over the sore on the animal's neck. I attain this object by the construction illustrated in the accompanying drawings, wherein like figures of reference indicate several parts in the several views, and in which—

Figure 1:
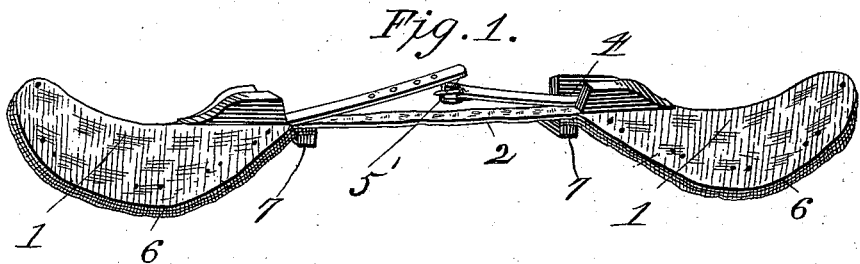
Figure 2:
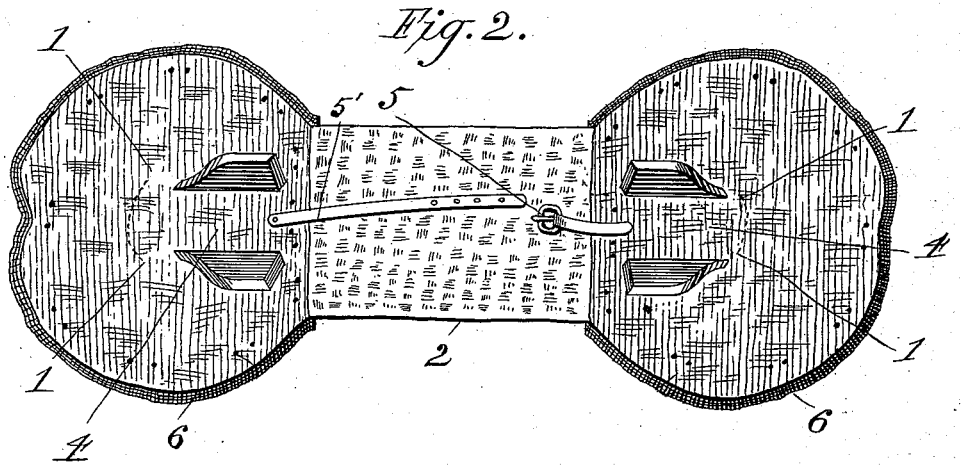
Figure 3:
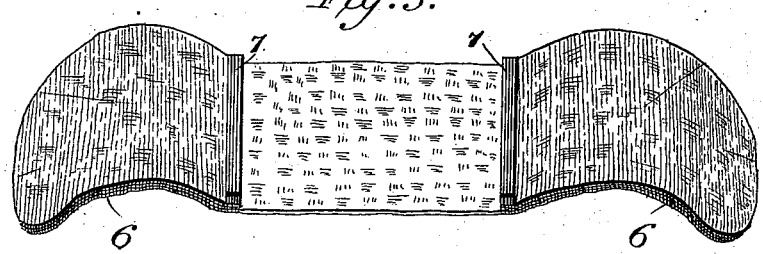

Figure 1 is a side elevation of my improved form of pad. Fig. 2 is a top plan view thereof. Fig. 3 is a bottom plan view.

1 1 indicate the side pads, which are lined with a thick cloth cushion, 6, secured thereto by suitable means and provided with inner opposingly-situated cross-strips, 7, and with outer-projecting lugs or retention-guides, 4, to keep the collar in a steady position relatively to the pad. The two pads 1 1 are secured to each other by a central webbing, 2, which is attached to the pads and conforms to the shape thereof, and thereby assuming the slightly concave-convex configuration of the said pads. A buckle, 5, is secured to one of the pads 1, and the adjusting-strap 5' to the other, and by means of which the pads 1 may be adjusted to the size of the animal, or drawn closer together to relax the tension on the central webbing, 2.

The cross-ribs 7, which are constructed of suitable pliable metal, act to keep the inner opposing ends of the side pads, 1, raised from the neck of the animal, and consequently the central webbing, 2, is raised above the sore upon the animal's neck, so that the air may have access thereto, and to keep the weight of the collar from bearing on the neck. By means of the central projections, 4, the collar is prevented from having a lateral movement, and thereby also caused to keep in its central adjustment. This will materially aid in the proper action of the pad entire, in that friction will be obviated.

What I claim is—

The combination of the two flat pads 1 1, having a thick under lining, 6, of soft material, and upper projections, 4, to retain the collar, the cross-strips 7, of pliable material, secured to the inner opposing ends of the pads 1, the thin webbing connected to the inner opposing ends of the pads 1, above the cross-strips 7, and buckles 5 and strap 5', arranged substantially as described, and for the purposes set forth.

FREDERICK WILLIAM KRAUSE.

Witnesses:
  MYRON BREWER,
  H. W. BALDWIN.